US008028058B2

(12) United States Patent
Ammerman, III et al.

(10) Patent No.: US 8,028,058 B2
(45) Date of Patent: Sep. 27, 2011

(54) DYNAMIC DISCOVERY AND REPORTING OF ONE OR MORE APPLICATION PROGRAM TOPOLOGIES IN A SINGLE OR NETWORKED DISTRIBUTED COMPUTING ENVIRONMENT

(75) Inventors: Raymond Perry Ammerman, III, Raleigh, NC (US); Paul Fredric Klein, Newbury Park, CA (US); Dannis Taje Yang, West Hills, CA (US)

(73) Assignee: International Business Machines Corporation, Armonk, NY (US)

( * ) Notice: Subject to any disclaimer, the term of this patent is extended or adjusted under 35 U.S.C. 154(b) by 1503 days.

(21) Appl. No.: 11/084,835

(22) Filed: Mar. 18, 2005

(65) Prior Publication Data

US 2006/0212569 A1    Sep. 21, 2006

(51) Int. Cl.
*G06F 15/173* (2006.01)
(52) U.S. Cl. ........................................ 709/224
(58) Field of Classification Search .................. 709/223, 709/224, 245; 370/254
See application file for complete search history.

(56) References Cited

U.S. PATENT DOCUMENTS

| | | | | |
|---|---|---|---|---|
| 6,098,111 A * | 8/2000 | Maegawa et al. | ............. | 719/310 |
| 6,334,158 B1 * | 12/2001 | Jennyc et al. | ................. | 719/328 |
| 6,665,714 B1 * | 12/2003 | Blumenau et al. | ............ | 709/222 |
| 7,111,779 B2 * | 9/2006 | Horikawa et al. | ............. | 235/380 |
| 7,200,651 B1 * | 4/2007 | Niemi | ............................ | 709/223 |
| 7,287,077 B2 * | 10/2007 | Haugh et al. | .................. | 709/225 |
| 7,310,774 B1 * | 12/2007 | Arquie et al. | ................. | 715/734 |
| 7,508,768 B2 * | 3/2009 | Yoon et al. | ..................... | 370/252 |
| 7,567,560 B1 * | 7/2009 | Balasubramaniyan | ....... | 370/389 |
| 7,761,527 B2 * | 7/2010 | Ferreira et al. | ................ | 709/207 |
| 7,769,851 B1 * | 8/2010 | Guruswamy et al. | ......... | 709/224 |
| 2002/0026478 A1 | 2/2002 | Rodgers et al. | | |
| 2002/0116493 A1 | 2/2002 | Schenkel et al. | | |
| 2002/0120768 A1 * | 8/2002 | Kirby et al. | ................... | 709/235 |
| 2002/0174208 A1 * | 11/2002 | Morlitz | ......................... | 709/223 |
| 2003/0097438 A1 | 5/2003 | Bearden et al. | | |
| 2003/0156552 A1 | 8/2003 | Banker et al. | | |
| 2003/0208572 A1 | 11/2003 | Shah et al. | | |
| 2003/0212781 A1 * | 11/2003 | Kaneda et al. | ................ | 709/223 |
| 2004/0090966 A1 | 5/2004 | Thomas | | |
| 2004/0122920 A1 * | 6/2004 | Josset et al. | ................... | 709/222 |
| 2004/0172466 A1 | 9/2004 | Douglas et al. | | |
| 2004/0174829 A1 | 9/2004 | Ayyagari | | |
| 2004/0221049 A1 | 11/2004 | Blumenau et al. | | |
| 2004/0226026 A1 | 11/2004 | Glass et al. | | |
| 2006/0101340 A1 * | 5/2006 | Sridhar et al. | ................ | 715/734 |

* cited by examiner

*Primary Examiner* — John Follansbee
*Assistant Examiner* — Madhu Woolcock

(57) ABSTRACT

Dynamic discovery and reporting of one or more application program topologies in a single or networked distributed computing environment allows IT professionals to maintain processes running on the network. In one embodiment, the dynamic discovery is performed by identifying one or more computers in a computer network, identifying one or more processes on each identified computer that are communicating over the network, and displaying a graphical representation of the topology of the processes communicating over the network.

17 Claims, 6 Drawing Sheets

DYNAMIC DISCOVERY AND REPORTING OF ONE OR MORE APPLICATION PROGRAM TOPOLOGIES IN A SINGLE OR NETWORKED DISTRIBUTED COMPUTING ENVIRONMENT

FIELD OF THE INVENTION

The invention is related to the field of monitoring application programs in a computer network.

BACKGROUND

Today's computer application programs are distributed in nature, relying on one or more networked computers to complete an assortment of computing tasks. One of the great challenges to information technology (IT) professionals, when measuring computer and application performance, is understanding the complex and sometimes dynamic interconnections between the various pieces of the computer application and their residence on various computing nodes.

To do this, most IT professionals rely on diagrams depicting application program interconnections. However, these diagrams are often inaccurate and out of date. The IT professionals also ask several IT individuals to piece together these connections from their recollections. However, experience has shown that these recollections are often wrong. What is needed is a way to dynamically detect and generate representations of the complex interconnections of application programs in a network environment in a programmatic way.

Conventional dynamic topology tools available in the IT workplace today fail to do this. In particular, most dynamic topology tools seek out and detect hardware interconnections such as a router that is found between computers. These types of tools target a more simplistic problem of asset management (understanding what hardware is in the network), and not of application topology (which is hardware independent).

Application topology defines how computer processes within hardware computers interact with other processes on the same and remote networked computers. An understanding of the application topology allows proper maintenance of pieces of the application programs in the network. For example, if an application is running slowly, the application topology is used to identify all pieces of the application that reside on the various remote computers, so that those application pieces can be examined. However, conventional tools are unable to display the application topology. Instead, they identify hardware components in the distributed computing environment, without identifying application processes that are being executed by the hardware components.

SUMMARY

Dynamic discovery and reporting of one or more application program topologies in a single or networked distributed computing environment allows IT professionals to maintain processes running on the network. In one embodiment, the dynamic discovery is performed by identifying one or more computers in a computer network, identifying one or more processes on each identified computer that are communicating over the network, and displaying a graphical representation of the topology of the processes communicating over the network.

DETAILED DESCRIPTION

An application program's topology is discovered by identifying network connections between source and destination computers, determining computer processes responsible for the network connections, and identifying computer applications that are executing the processes. For example, the discovery method observes data from network protocols of packets transmitted to or from a computer via a network layer packet sniffing device. The observed data can include network addresses and port numbers of packets sent from one computer to another, and can be used to identify network connections between origin and destination computer nodes. Further analysis can determine the computer processes that are creating and maintaining the network connections, along with their hardware locations. A topological graph of each process on the network can then be generated and displayed to a user.

Figure 1:
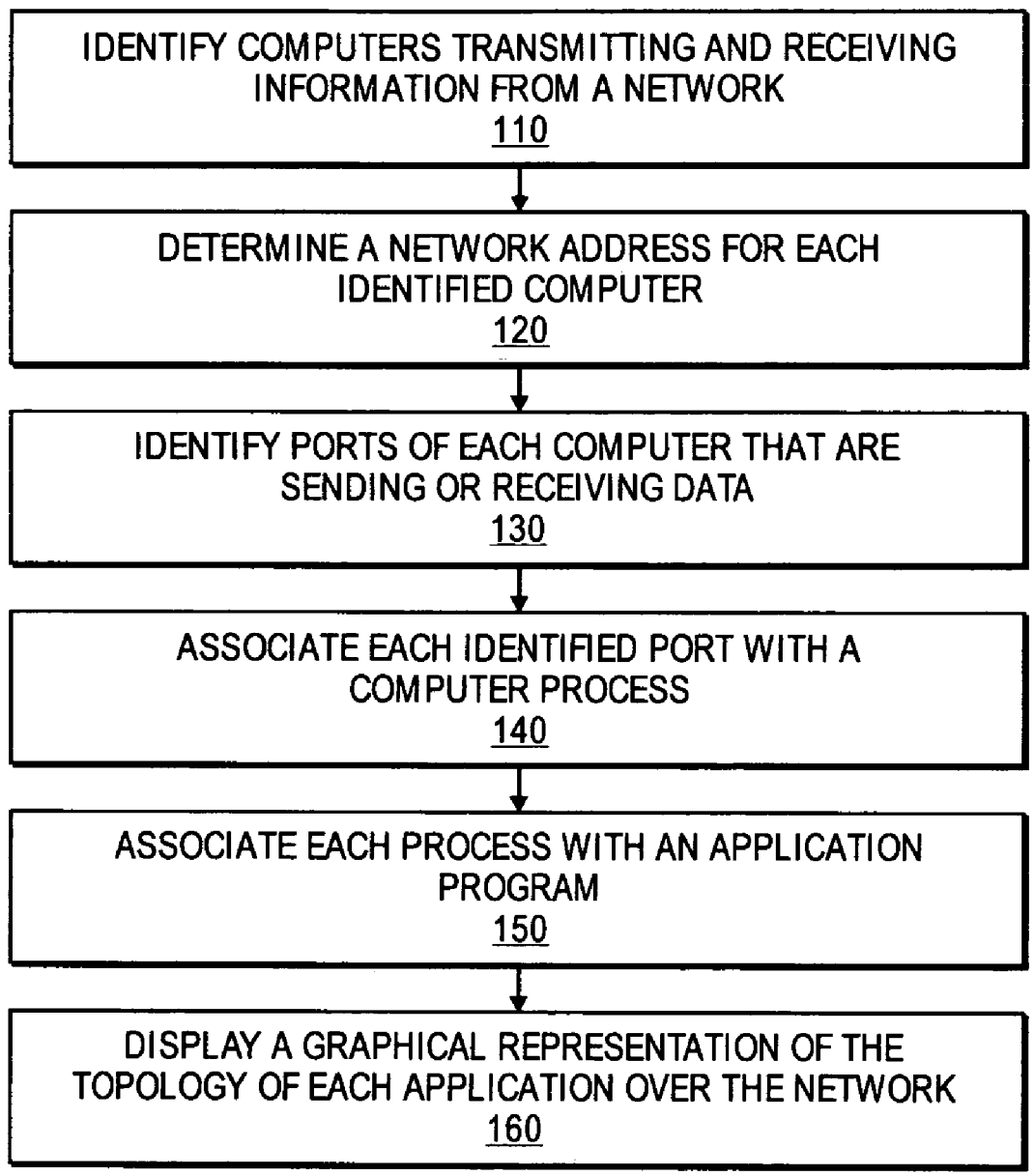
FIG. 1 shows an example of a method for dynamic discovery and reporting of application program topologies in a networked environment.

FIG. 1 shows an example of a method for dynamically discovering an application program's topology in a distributed computing environment. Computers transmitting and receiving information on a network are identified, 110. A network address for each identified computer is determined, 120. One or more ports that are sending or receiving data on each identified computer are identified, 130. Each identified port is associated with a computer process, 140. For example, if port 80 is sending or receiving data, this port is associated with a web traffic process. Then, each process is associated with a corresponding application program that is responsible for the process, 150. For example, if a computer is executing a web traffic process, the discovery method determines that the process is being executed by an Internet Explorer application program. A graphical representation of the topology of the processes run by each application program over the network is generated and displayed, 160.

The method of FIG. 1 provides a protocol for observing and maintaining the relationships between origin computer nodes and destination computer nodes, along with their TCP/IP addresses and port numbers. The method can observe the computer processes on the hardware computer nodes which are responsible for network connections, allowing an IT professional to understand how applications are interconnected, and what computer processes within those hardware nodes are involved. The method therefore provides a dynamic and programmatic technique to detect application topology for the IT industry.

Figure 2:
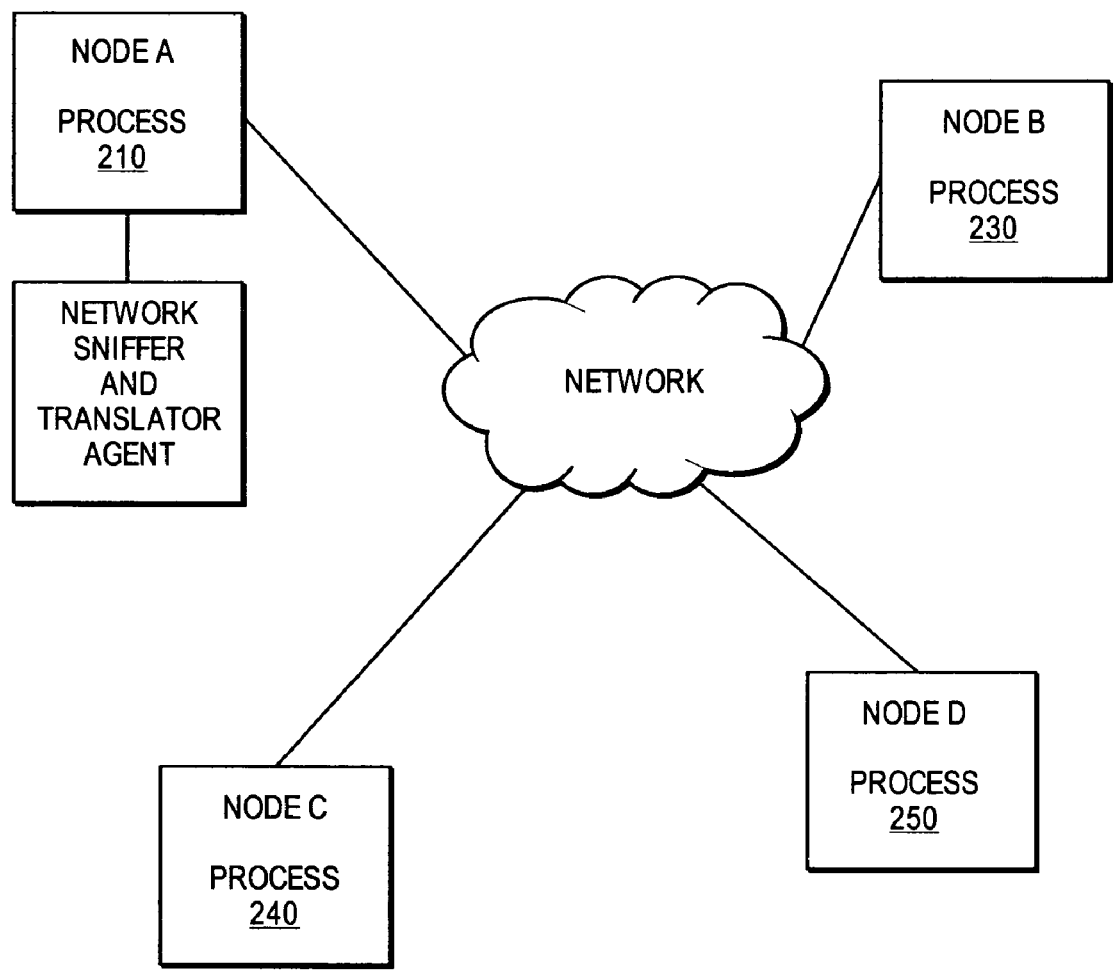
FIGS. 2, 3, and 4 show examples of systems to perform the method of dynamic discovery and reporting of program topologies.

FIG. 2 shows an example of a system to dynamically discover application program topologies using the method of FIG. 1. With this discovery method and system, an IT professional can see how a computer process on a computer, such as node A of FIG. 2, connects to another process on another computer, such as node B.

In order for the discovery method to observe the network traffic in a measured environment, a network sniffer device and translator agent is attached to the network. The sniffer device watches TCP/IP protocols for session establishments that occur between the distributed computers. In one embodiment, the sniffer device does this by observing network addresses and port numbers of data packets being transmitted over the network.

For example, the discovery method, by using the sniffer to observe network addresses of transmitted data, determines that node A is communicating with node B. Based on the origin and destination port numbers of the transmitted data, the discovery method determines that process 210 on node A is communicating with process 230 on node B. Process 230, in turn, is connected to process 240 on node C, and also to process 250 on node D.

The translator agent translates the observed TCP/IP addresses and port numbers into names of computer processes that are responsible for transmitting and receiving the data packets. For example, port numbers 0 through 1023 are each associated with a specific computer process according to industry standards. If the sniffer observes data traffic through a port of a computer node that is not associated with an industry standard, such as any port above 1023, then the translator agent can obtain information about the process directly from the computer node.

In the example shown in FIG. 2, if the sniffer observes a data packet going to port 80 of node A, then the translator maps port 80 to the industry's standard use for this port, which is a web based process. With this information about the type of process running on node A, along with the connections that it has with other processes on the network, a topology of this process in this distributed computing environment can be generated.

In addition to generating a topology of processes in the network, the discovery method can map the processes to applications that are implementing the processes. For example, after mapping the port to a process, such as mapping port 80 to a web based process, the translator agent can obtain more specific information about the application that is causing the process to be executed. In one embodiment, the translator agent can ask node A to identify the application that is executing the web based process using port 80. Node A can then indicate that the application is Microsoft's Internet Explorer.

After discovering the applications that are actively communicating over the network, the discovery method can state the process connections between nodes in terms of application program topology. For example, the discovery method can state that process 210 on node A is run by Internet explorer, which is running on a user's laptop, and is connected to process 230 on node B, which is executed by IBM's WebSphere server in Austin. This server is also connected to an application server in New York, process 240 on node C, and to a DB2 server in Armonk, process 250 on node D.

The system of FIG. 2 includes a TCP/IP sniffer, and an agent for translating TCP/IP addresses and port numbers into computer process names. The sniffer can watch the TCP/IP protocols for session establishment between one or more distributed computers, which provides the ability to see the network traffic in a measured environment. However, because the amount of traffic on a network is often very large, the traffic can be filtered by a switch, so that a smaller and more manageable amount of traffic reaches a given node.

By placing sniffers on multiple computers in the network, the system is able to see network information that can be lost when hardware switches are used. The system may also have agents on multiple computers, to translate between network resources being used, such as computer nodes, and the processes on each node that are using the resources. The system can be designed to provide an effective combination of network sniffers and software agents.

Figure 3:
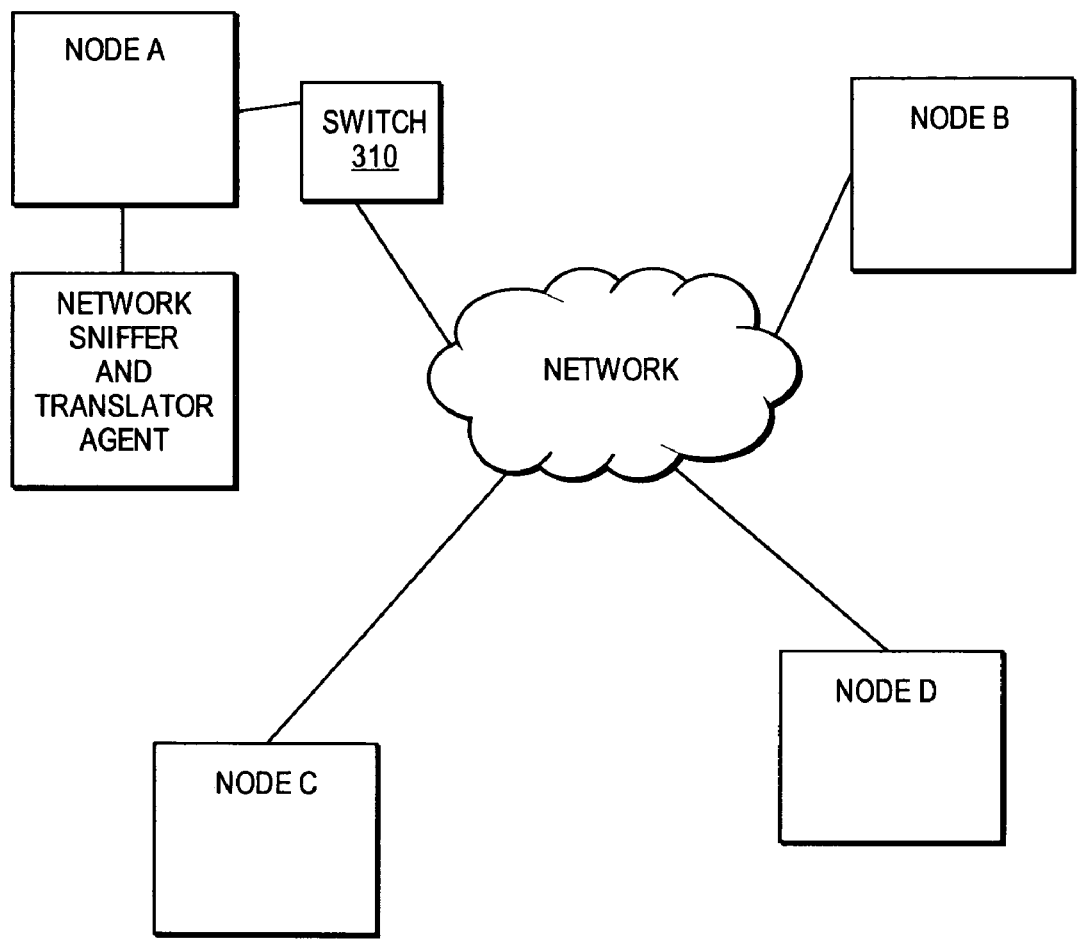

For example, FIG. 3 shows switch 310 attached to node A to filter the data traffic so that only traffic intended for node A is received by node A. The sniffer attached to node A is able to observe the network addresses and port numbers of data packets going to and from node A. Therefore, the discovery method, using the system shown in FIG. 3, can create a topology of applications communicating with node A. However, the sniffer is unable to observe processes on the network that are not communicating with node A, because the network switch filters out much of the network information needed to discover the topologies of these processes.

Figure 4:
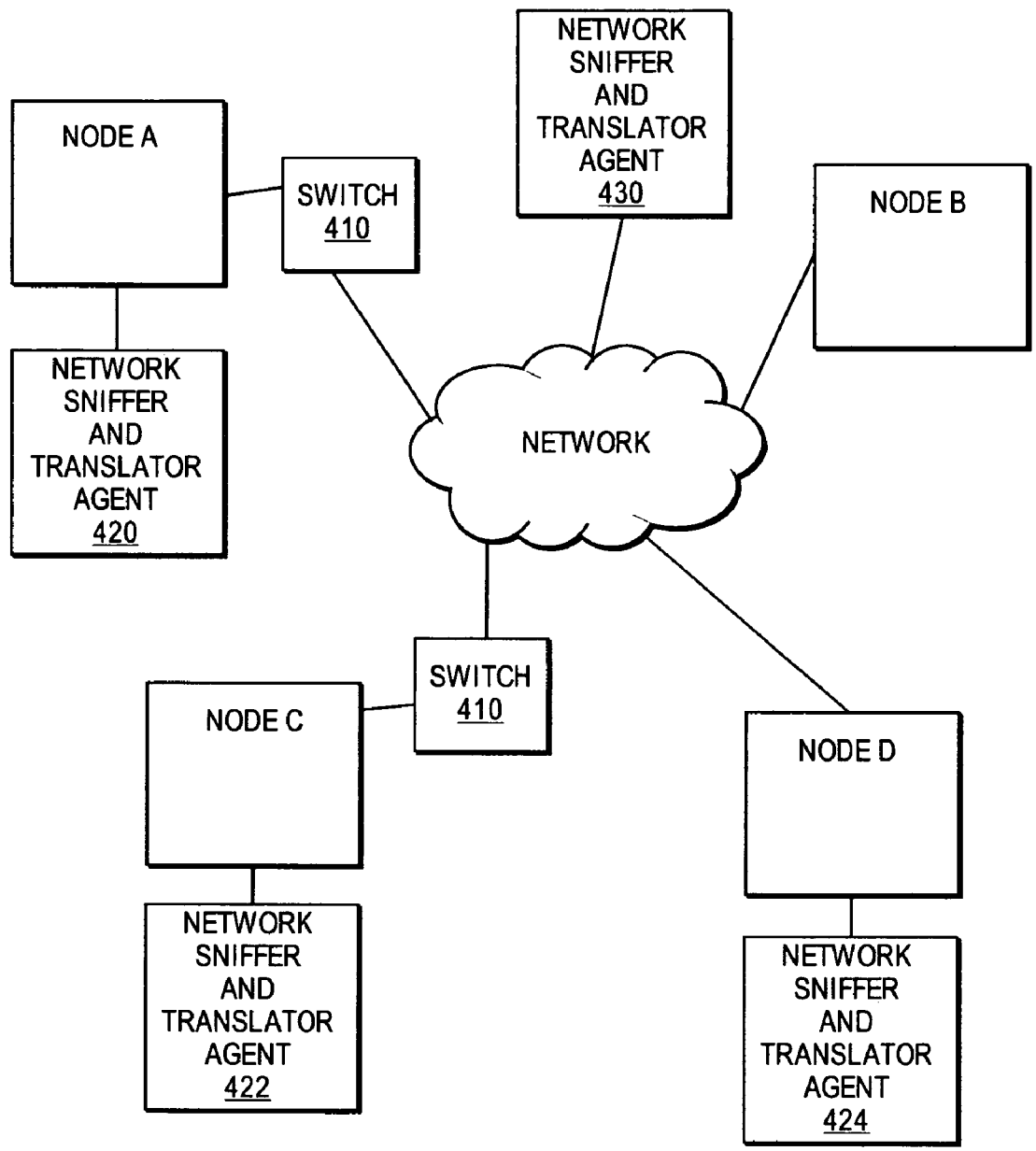

To discover application topologies in a network that includes switches to filter data traffic from individual nodes, multiple software sniffers and agents may be placed on multiple computers in the distributed computing environment, as shown in FIG. 4. Because each sniffer can obtain data about network traffic to and from its associated computer, even if the traffic is filtered by a switch, the discovery method can receive this data from the multiple sniffers to observe network information, such as addresses and port numbers, about the overall data traffic that is generally undetected by an individual sniffer that observes the traffic after it is filtered by a network switch.

Alternatively, a sniffer may be placed in a location of the network where it can observe the network traffic before it is filtered, such as sniffer 430 as shown in FIG. 4. A switch may also be programmed to provide unfiltered data traffic to the sniffer, while filtering traffic to a given node. The switch may also be programmed to selectively filter data traffic sent to the sniffer, so that only certain application topologies can be discovered by the discovery method.

With this method for discovering application topologies, the IT professional has an advantage in understanding how applications are interconnected among various computers in a network, because the topology discovery method actually observes the connections that are taking place. For example, the discovery method observes which hardware nodes are involved in communication, and also observes the computer processes within those hardware nodes that are responsible for the communication.

The computer processes executing within the hardware components define the topology of an application program as it is executed across a network. The hardware components themselves are just the execution locations of the application's processes. In other words, if the physical location of the computer node B shown in FIG. 2 changes from Austin to Dallas, the application program's topology remains the same.

However, due to the dynamic nature of an application program, the topology of the application in a distributed computing environment could change at any time. For example, a software upgrade could cause the application to change the way that its processes are connected in the network. With the topology discovery method, which uses a dynamic and programmatic technique to detect a topology, any changes to the application's topology can be automatically detected and graphically displayed to an IT professional.

Figure 5:
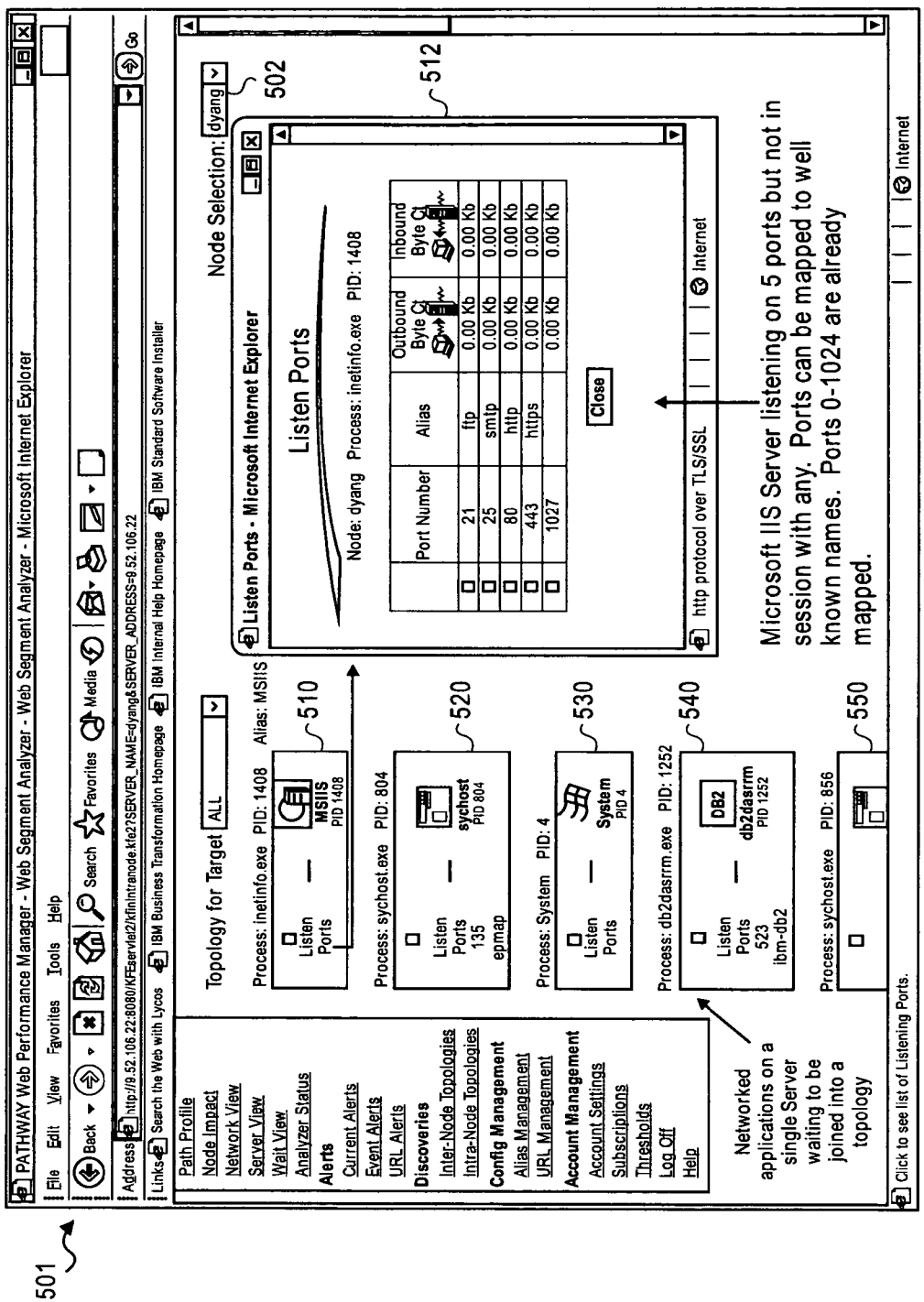
FIGS. 5 and 6 show examples of graphical representations of application program topologies generated by the dynamic discovery and reporting method.

FIG. 5 shows an example of a graphical representation of application topologies for a computer node generated by the discovery method. Several detected processes, 510, 520, 530, 540, and 550 for selected node 502 labeled "dyang" are displayed in graphical user interface 501. The five detected processes are networked applications that are running on a single server, node 502, and are waiting to be joined into a topology.

A summary of topology information for each process is shown in the graphical user interface. For example, the discovery method determines that the process of box 510 has a process id of 1408. The discovery method translates this process id into the name of the process, which is inetinfo.exe. The method further determines that process inetinfo is run by the application program named Internet Explorer. The process id, process name, application name, and an icon representing the application are shown in box 510, along with a symbol for listen ports.

If a user would like to observe additional information about the network topology of process inetinfo, the user can click the listen ports icon shown in box 510. The listen port box 512 is then displayed to the user to show the ports that the Internet Explorer (IE) application program, running on node 502, is listening to. For example, listen port box 512 shows that the inetinfo process, run by IE, is listening to ports 21, 25, 80, 443, and 1027 of computer node 502. The ports that are numerically below 1024 can be mapped to industry standard protocols, such as ftp, http, and https, as shown in FIG. 5. Port 1027 is not associated with an industry standard, so the discovery method may perform an additional analysis using the method shown in FIG. 1 to determine the protocol that is using this port. The listen port box 512 shows that the outbound and inbound byte counts of each port is zero, which indications that the IE application program running on dyang's computer is not communicating with other processes on the network.

Box 520 shows information about a process having an id of 804. The discovery method determines that this process id is for a svchost.exe process, and displays the icon for this process in box 520. This process is listening to one port, 135, which is for an epmap protocol. Box 530 shows information for process id 4, which is a system process. Because the system process is listening to multiple ports, the user can display information about these ports by selecting the listen ports icon in box 530. Box 540 displays information about process id 1252, which the discovery method determines is for a db2 process. This process is listening to port 523, which has an alias of ibm-db2. Box 550 shows a process id of 856, which also represents a svhost process.

Figure 6:
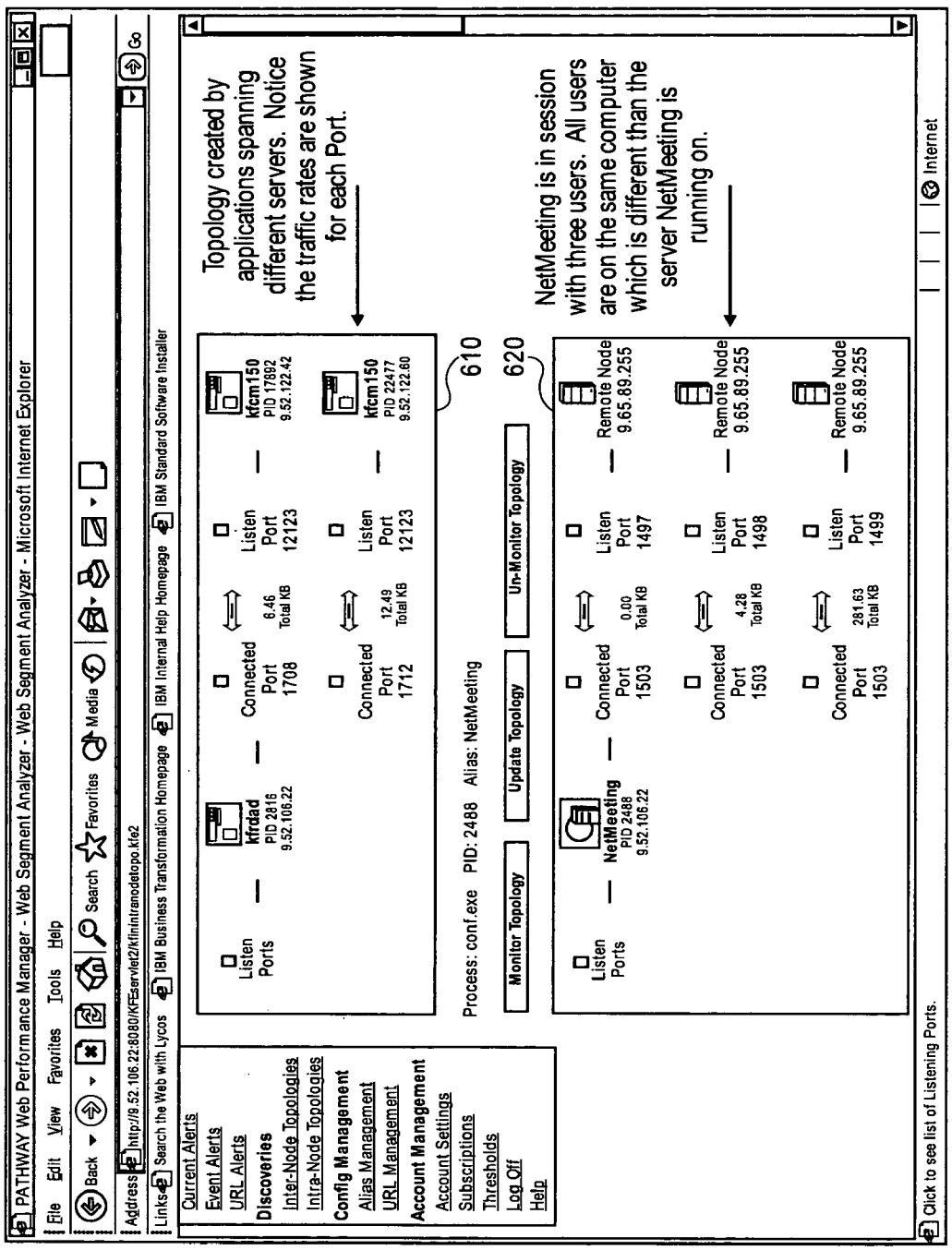

FIG. 6 shows examples of topologies for applications running on a network. Box 610 shows the topologies for a process on a computer node with other processes on other nodes of the network. The network addresses are used to identify each node, and the process names and ids are used to identify the processes on each node. For example, one of the nodes has a network address of 9.52.106.22, and is running a process with an id of 2816. This process id is mapped to the name of the process, which is kfrdad. This process is connected to port 1708 of node 9.52.106.22, and is communicating with process kfcm 150 running on node 9.52.122.42 through listen port 12123. The traffic between the two nodes is shown as 6.46 total kilobytes.

The kfrdad process of node 9.52.106.22 is also connected to port 1712, and is communicating with process kfcm on computer node 9.52.122.60 through listen port 12123. The traffic between these two nodes is 12.49 total kilobytes. As shown in FIG. 6, the process id for process kfcm 150 on node 9.52.122.42 is 17892, and the process id for process kfcm 150 on node 9.52.122.60 is 22477. The process id is assigned to a process by a node when the program starts running on a node. Thus, each process that is running on a node has a unique id. However, the process id by itself may not indicate the name of the process. After discovering the id for a process being executed on a node, the discovery method can ask the node to identify the name of the process based on the corresponding process id. The discovery method can then display the name and icon of the process to the user.

FIG. 6 also shows topologies for an application program in box 620 from the perspective of node 9.52.106.22. The process id on this node is 2488, and the process name is conf.exe. This name is associated with the application program that is running the process, which is netmeeting. The topology for the conf.exe process shows that this process is in session with three different users. The conf.exe process communicates through connected port 1503 to a first user listing on port 1497 of remote node 9.65.89.255. This process is also connected to a second user listening on port 1498 of node 9.65.89.255, and to a third user listening on port 1499 of node 9.65.89.255. The three users in session with the netmeeting application in this example are sharing the same computer. Thus, the server 9.52.106.22 that is running the application connects to the three users through three ports of the remote computer.

The discovery method is therefore able to provide a graphical drawing to show distributed computer hardware as shadow boxes, with computer processes within the computer boxes, and lines which show the connections between computer processes on a given computer and computer processes on an adjacent computer in the network.

The invention claimed is:

1. A computer-implemented method, comprising:

executing, by a processor, an agent; the agent being stored in memory coupled to the processor;

identifying, by the agent, a first process that uses a first port number from a packet observed by at least one network sniffer based on an association between the first process and the first port number, wherein packets in a network comprise the packet; the packet having a first network address, the first port number, a second network address and a second port number;

identifying, by the agent, a second process that uses the second port number from the packet observed by the at least one network sniffer based on an association between the second process and the second port number;

identifying, by the agent, the second process that uses the second port number from another packet observed by the at least one network sniffer based on the association between the second process and the second port number; wherein the packets comprise the another packet; the another packet having the second network address, the second port number, a third network address and a third port number;

identifying, by the agent, a third process that uses the third port number from the another packet observed by the at least one network sniffer based on an association between the third process and the third port number;

sending, by the agent, a first request to a first computer having the first network address from the packet, to identify a first application having the identified first process;

receiving, by the agent, a first application name in response to the first request;

sending, by the agent, a second request to a second computer having the second network address from the packet, to identify a second application having the identified second process;

receiving, by the agent, a second application name from the second computer in response to the second request;

sending, by the agent, a third request to a third computer having the third network address from the another packet, to identify a third application having the identified third process;

receiving, by the agent, a third application name from the third computer in response to the third request;

displaying a graphical representation of a topology indicating that the first application on the first computer communicates with the second application on the second computer over the network, the graphical representation comprising the first application name, the first network address from the packet, the second application name, and the second network address from the packet, wherein the graphical representation indicates that the second application on the second computer communicates with the third application on the third computer, the graphical representation comprising the received third application name; and determining an amount of traffic based on at least a subset of the packets transmitted between a first port having the first port number and a second port having the second port number;

wherein the graphical representation comprises an indicator of the amount of traffic.

2. The method of claim 1 wherein the identifying, by the agent, the first process comprises:
   requesting, by the agent, that the first computer provide a first process name of the first process; and
   receiving, by the agent, the first process name from the first computer;
   wherein the graphical representation comprises the received first process name.

3. The method of claim 1 wherein the identifying, by the agent, the second process that uses the second port number from the packet comprises:
   requesting, by the agent, that the second computer provide a second process name of the second process; and
   receiving, by the agent, the second process name from the second computer;
   wherein the graphical representation comprises the received second process name.

4. The method of claim 1 further comprising:
   requesting, by the agent, that the second computer provide a process identifier of the second process; and
   receiving, by the agent, the process identifier from the second computer;
   wherein the graphical representation comprises the received process identifier.

5. The method of claim 1
   wherein the graphical representation comprises at least one visual indicator that indicates that the first process and the second process are communicating.

6. The method of claim 1 wherein the graphical representation comprises a graphical communication icon that indicates that the first process is communicating with the second process.

7. The method of claim 1 wherein the first application is a web browser and the first application name is a name of the web browser, wherein the second application is a server and the second application name is a name of the server.

8. The method of claim 1 wherein the first application is a web browser and the first application name is a name of the web browser; wherein the second application is a server and the second application name is a name of the server; wherein the third application is a database management system and the third application name is a name of the database management system.

9. A system comprising:
   at least one processor; and
   memory storing instructions executable by the at least one processor, the instructions to:
   identify a first process that uses a first port number from a packet observed by at least one network sniffer based on an association between the first process and the first port number, wherein packets in a network comprise the packet; the packet having a first network address, the first port number, a second network address and a second port number;
   identify a second process that uses the second port number from the packet observed by the at least one network sniffer based on an association between the second process and the second port number;
   identify the second process that uses the second port number from another packet observed by the at least one network sniffer based on the association between the second process and the second port number; wherein the packets comprise the another packet; the another packet having the second network address, the second port number, a third network address and a third port number;
   identify a third process that uses the third port number from the another packet observed by the at least one network sniffer based on an association between the third process and the third port number;
   send a first request to a first computer having the first network address from the packet, to identify a first application having the identified first process;
   receive a first application name from the first computer in response to the first request;
   send a second request to a second computer having the second network address from the packet, to identify a second application having the identified second process;
   receive a second application name from the second computer in response to the second request;
   send a third request to a third computer having the third network address from the another packet, to identify a third application having the identified third process;
   receive a third application name from the third computer in response to the third request;
   display a graphical representation of a topology indicating that the first application on the first computer communicates with the second application on the second computer over the network, the graphical representation comprising the received first application name, the first network address from the packet, the received second application name, and the second network address from the packet, wherein the graphical representation indicates that the second application on the second computer communicates with the third application on the third computer, the graphical representation comprising the received third application name; and
   determine an amount of traffic based on at least a subset of the packets transmitted between a first port having the first port number and a second port having the second port number;
   wherein the graphical representation comprises an indicator of the amount of traffic.

10. The system of claim 9, wherein the instructions to identify the first process comprise instructions to:
    send a request to the first computer to provide a first process name of the first process;
    receive the first process name from the first computer;
    wherein the graphical representation comprises the first process name.

11. The system of claim 9 wherein the first application is a web browser and the first application name is a name of the web browser, wherein the second application is a server and the second application name is a name of the server.

12. The system of claim 9 wherein the first application is a web browser and the first application name is a name of the web browser; wherein the second application is a server and the second application name is a name of the server; wherein the third application is a database management system and the third application name is a name of the database management system.

13. A computer program product for discovering application program topology; the computer program product comprising:
> a non-transitory computer readable storage medium;
> first instructions to identify a first process that uses a first port number from a packet observed by at least one network sniffer based on an association between the first process and the first port number; wherein packets in a network comprise the packet; the packet having a first network address, the first port number, a second network address and a second port number;
> second instructions to identify a second process that uses the second port number from the packet observed by the at least one network sniffer based on an association between the second process and the second port number;
> third instructions to identify the second process that uses the second port number from another packet observed by the at least one network sniffer based on the association between the second process and the second port number; wherein the packets comprise the another packet; the another packet having the second network address, the second port number, a third network address and a third port number;
> fourth instructions to identify a third process that uses the third port number from the another packet observed by the at least one network sniffer based on an association between the third process and the third port number;
> fifth instructions to send a first request to a first computer having the first network address from the packet, to identify a first application having the identified first process;
> sixth instructions to receive a first application name from the first computer in response to the first request;
> seventh instructions to send a second request to a second computer having the second network address from the packet, to identify a second application having the identified second process;
> eighth instructions to receive a second application name from the second computer in response to the second request;
> ninth instructions to send a third request to a third computer having the third network address from the another packet, to identify a third application having the identified third process;
> tenth instructions to receive a third application name from the third computer in response to the third request;
> eleventh instructions to display a graphical representation of a topology indicating that the first application on the first computer communicates with the second application on the second computer over the network, the graphical representation comprising the received first application name, the first network address from the packet, the received second application name, and the second network address from the packet, wherein the graphical representation indicates that the second application on the second computer communicates with the third application on the third computer, the graphical representation comprising the received third application name; and
> twelfth instructions to determine an amount of traffic based on at least a subset of the packets transmitted between a first port having the first port number and a second port having the second port number;
> wherein the graphical representation comprises an indicator of the amount of traffic;
> wherein the first, second, third, fourth, fifth, sixth, seventh, eighth, ninth, tenth, eleventh and twelfth instructions are stored on the non-transitory computer readable storage medium.

14. The computer program product claim 13, the first instructions to identify comprising:
> thirteenth instructions to send a request to the first computer to provide a first process name of the first process;
> fourteenth instructions to receive the first process name from the first computer;
> wherein the graphical representation comprises the first process name; and
> wherein the thirteenth and fourteenth instructions are stored on the non-transitory computer readable storage medium.

15. The computer program product of claim 13 wherein the graphical representation comprises at least one visual indicator that indicates that the first process and the second process are communicating.

16. The computer program product of claim 13 wherein the first application is a web browser and the first application name is a name of the web browser; wherein the second application is a server and the second application name is a name of the server.

17. The computer program product of claim 13 wherein the first application is a web browser and the first application name is a name of the web browser; wherein the second application is a server and the second application name is a name of the server; wherein the third application is a database management system and the third application name is a name of the database management system.

* * * * *